US009828862B2

(12) United States Patent
Zatorski et al.

(10) Patent No.: US 9,828,862 B2
(45) Date of Patent: *Nov. 28, 2017

(54) FRANGIBLE AIRFOIL

(71) Applicant: General Electric Company, Schenectady, NY (US)

(72) Inventors: Darek Tomasz Zatorski, Fort Wright, KY (US); Ian Francis Prentice, Cincinnati, OH (US); Randy M. Vondrell, Sharonville, OH (US); Andrew Breeze-Stringfellow, Montgomery, OH (US); Raymond Anthony Humble, Hamilton, OH (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/596,804

(22) Filed: Jan. 14, 2015

(65) Prior Publication Data
US 2016/0201503 A1   Jul. 14, 2016

(51) Int. Cl.
*F01D 21/04* (2006.01)
*F01D 5/28* (2006.01)
*F01D 5/14* (2006.01)
*F04D 29/32* (2006.01)

(52) U.S. Cl.
CPC .............. *F01D 5/282* (2013.01); *F01D 5/147* (2013.01); *F01D 21/04* (2013.01); *F01D 21/045* (2013.01); *F04D 29/324* (2013.01); *Y02T 50/672* (2013.01)

(58) Field of Classification Search
CPC ........ F01D 21/045; F01D 5/282; F01D 5/147; F05D 2260/311; F05D 2300/603

USPC .................. 415/9; 416/2, 229 A, 230, 241 A
See application file for complete search history.

(56) References Cited

U.S. PATENT DOCUMENTS

| 2,919,889 | A |   | 1/1960  | Rubel |
|-----------|---|---|---------|-------|
| 3,551,070 | A | * | 12/1970 | Glucksman ............ F04D 29/38 |
|           |   |   |         | 416/210 R |
| 3,996,089 | A |   | 12/1976 | More et al. |
| 6,290,895 | B1 |  | 9/2001  | Wang et al. |
| 7,604,199 | B2 |  | 10/2009 | McMillan et al. |
| 7,794,197 | B2 |  | 9/2010  | Thompson et al. |
| 8,083,489 | B2 |  | 12/2011 | Viens et al. |
| 8,496,438 | B2 |  | 7/2013  | Lafont |
| 8,568,082 | B2 |  | 10/2013 | Beckford et al. |
| 8,585,368 | B2 |  | 11/2013 | Viens et al. |
| 8,821,124 | B2 |  | 9/2014  | Viens et al. |

(Continued)

FOREIGN PATENT DOCUMENTS

| EP | 2159379 A2 | 3/2010 |
| EP | 2365186 A2 | 9/2011 |
| GB | 2249592 A  | 5/1992 |

OTHER PUBLICATIONS

Derek Tomasz Zatorski, Jan. 14, 2015, U.S. Appl. No. 14/596.815.

(Continued)

Primary Examiner — Christopher Verdier
(74) Attorney, Agent, or Firm — General Electric Company; William Scott Andes

(57) ABSTRACT

A frangible airfoil that mitigates adverse conditions associated with release of material resulting from impact damage to the composite blade is provided, the airfoil having provisions for dissipating energy, self-shredding, and predetermined release trajectory.

19 Claims, 10 Drawing Sheets

(56) References Cited

U.S. PATENT DOCUMENTS

| | | | |
|---|---|---|---|
| 9,243,512 B1 * | 1/2016 | Zatorski | F01D 21/045 |
| 2007/0041842 A1 * | 2/2007 | Thompson | F01D 5/147 |
| | | | 416/223 R |
| 2011/0217160 A1 * | 9/2011 | McMillan | B29C 66/004 |
| | | | 415/200 |
| 2012/0034089 A1 * | 2/2012 | Wadewitz | B29C 70/24 |
| | | | 416/223 R |
| 2013/0330496 A1 | 12/2013 | Kray et al. | |

OTHER PUBLICATIONS

Derek Tomasz Zatorski, Jan. 14, 2015, U.S. Appl. No. 14/596,841.
PCT Search Report and Written Opinion issued in connection with corresponding PCT Application No. PCT/US2016/013419 dated Apr. 25, 2016.
Non-Final Office Action issued in connection with related U.S. Appl. No. 14/596,841 dated Dec. 20, 2016.
U.S. Final Office Action issued in connection with related U.S. Appl. No. 14/596,841 dated Jul. 26, 2017.

* cited by examiner

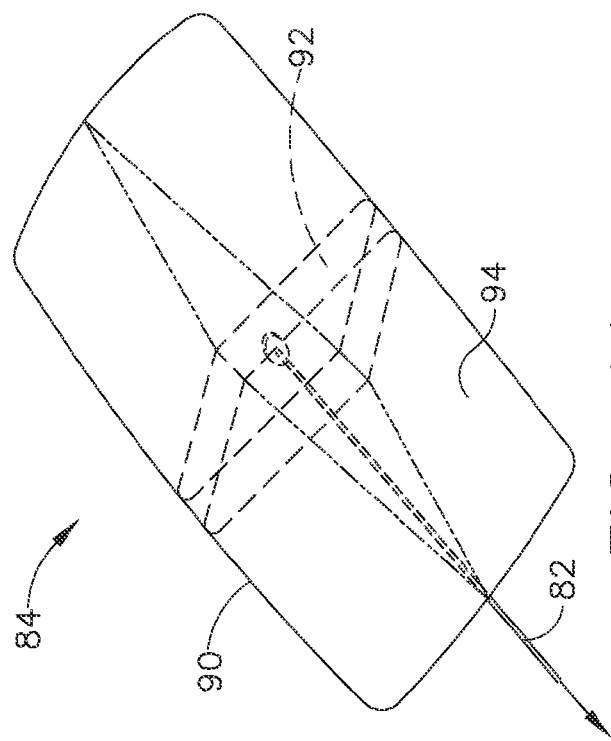
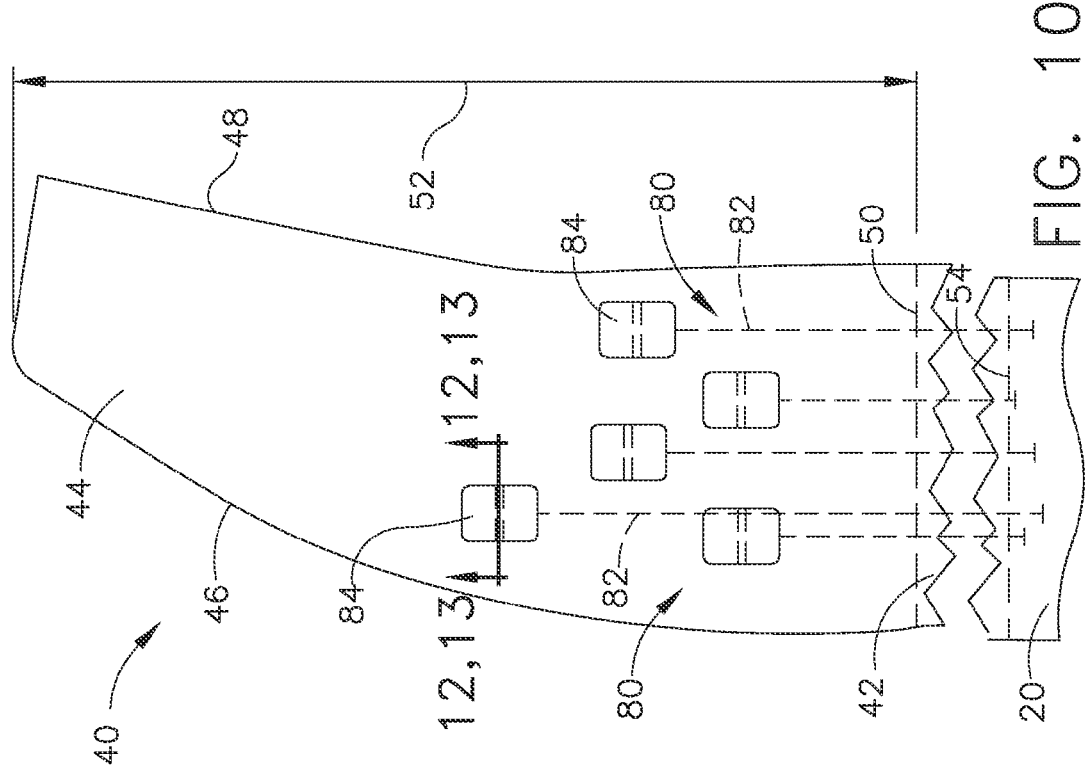

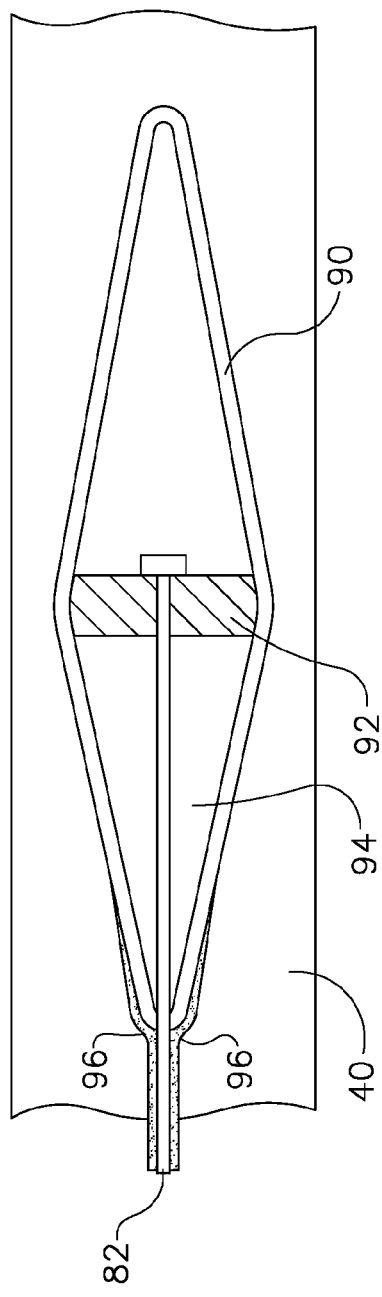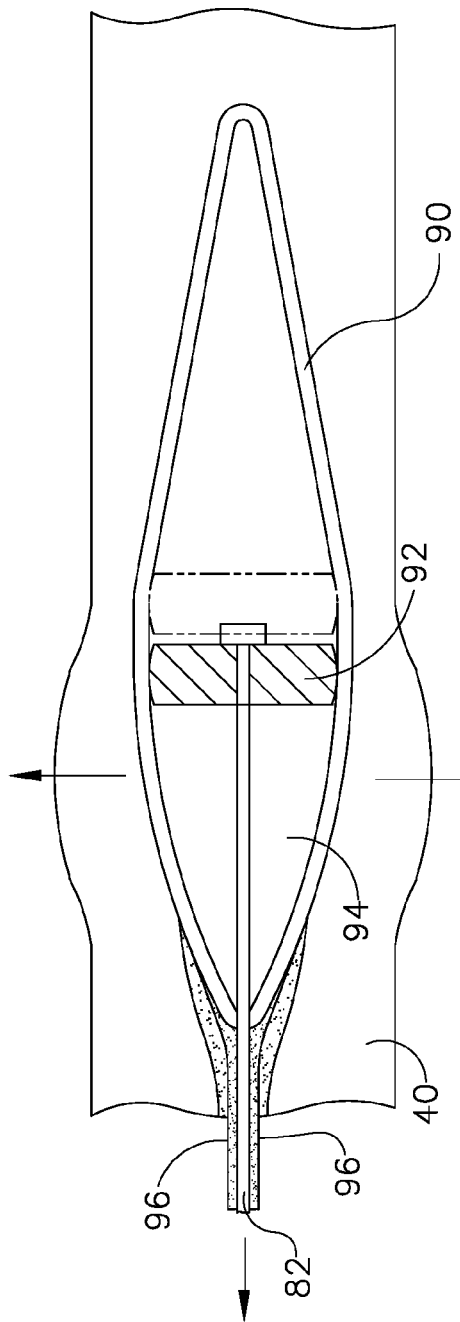

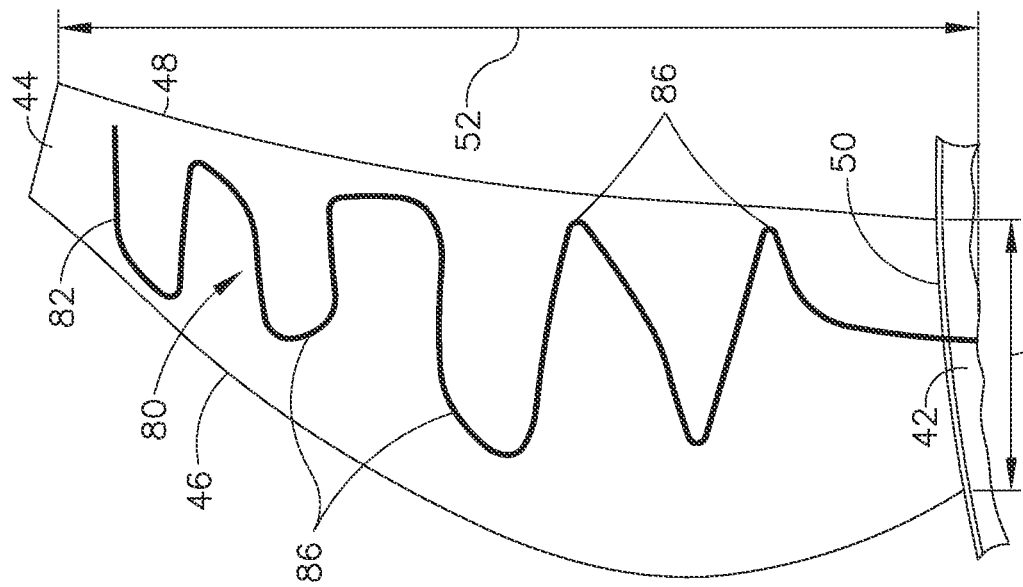
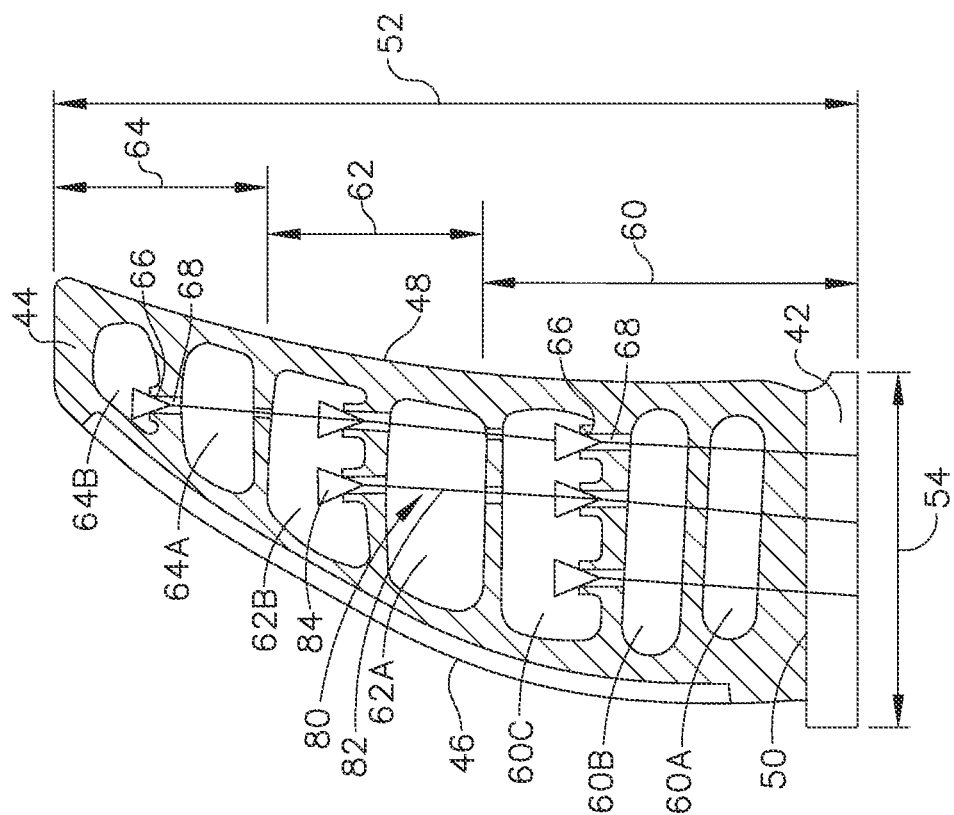

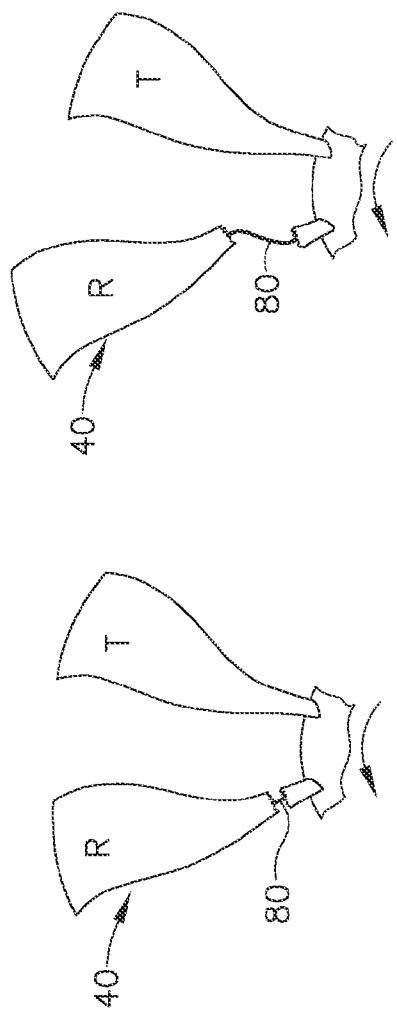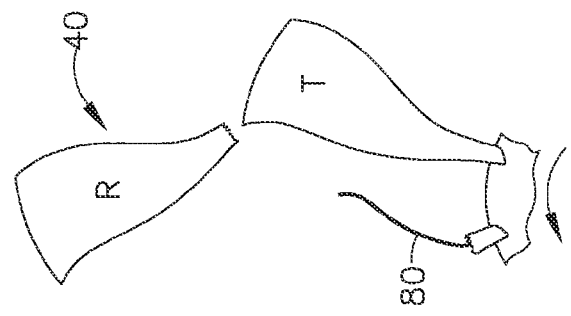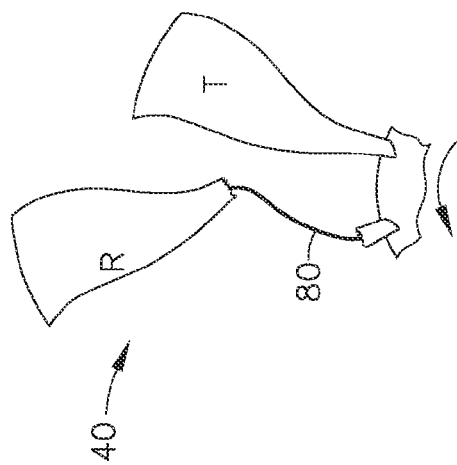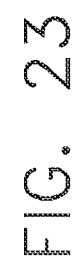

FRANGIBLE AIRFOIL

CROSS-REFERENCE TO RELATED APPLICATIONS

This application cross-references concurrently filed U.S. patent application Ser. No. 14/596,815 by Darek Zatorski, entitled "A rotary machine with a frangible composite blade", now issued as U.S. Patent Publication No. 9,243,512, the entire contents of which is incorporated by reference herein, and concurrently filed U.S. patent application Ser. No. 14/596,841 by Darek Zatorski, entitled "A method of manufacturing a frangible blade," the entire contents of which is incorporated by reference herein.

STATEMENT REGARDING FEDERALLY SPONSORED RESEARCH

None.

TECHNICAL FIELD

The field of the present disclosure relates generally to rotary machines, and more particularly to airfoils used with rotary machines. The present embodiments relate generally to an airfoil for use in a fan module of an aircraft mounted gas turbine engine. More specifically, present airfoil embodiments relate to, but are not limited to, a composite fan blade or propeller which mitigates adverse conditions associated with release of material resulting from impact damage.

BACKGROUND OF THE INVENTION

At least some known rotary machines, such as gas turbine engines, some of which are used for aircraft propulsion, include a plurality of rotating blades or propellers that are part of a fan module that channel air downstream. Conventional single rotation turboprop gas turbine engines provide high efficiency at low cruise speeds, for flight Mach numbers up to about 0.7, although some single rotation turboprop engines have been considered for higher cruise speeds. Higher cruise speeds, Mach 0.7 to 0.9, are typically achieved using a ducted fan gas turbine engine to produce the relatively high thrust required. Unducted, counter-rotating propeller gas turbine engines, frequently referred to as the unducted fan (UDF®), or open-rotor, have been developed to deliver the high thrust required for high cruise speeds with higher efficiency than ducted fans. These blades and propellers have certain integrity to foreign object debris ingested by the engine, but the ingestion of foreign objects still can lead to releasing damaging portions of the rotating blade or propeller and therefore can be improved.

SUMMARY

In one aspect, an embodiment of the invention relates to an airfoil comprising a self-shredding composite blade.

In another aspect, an embodiment of the invention relates to an airfoil comprising a self-shredding composite blade including at least one energy dissipating member.

In another aspect, an embodiment of the invention relates to an airfoil comprising a self-shredding composite blade including at least one energy dissipating member wherein the at least one energy dissipating member is at least partially co-cured with the self-shredding composite blade.

In another aspect, an embodiment of the invention relates to an airfoil comprising a self-shredding composite blade including at least one energy dissipating member wherein the at least one energy dissipating member comprises at least one strand.

In another aspect, an embodiment of the invention relates to an airfoil comprising a self-shredding composite blade including at least one energy dissipating member wherein the at least one energy dissipating member comprises at least one damage initiator.

In another aspect, an embodiment of the invention relates to an airfoil comprising a self-shredding composite blade including at least one energy dissipating member wherein the at least one energy dissipating member is at least partially covered with a release agent.

In yet another aspect, an embodiment of the invention relates to an airfoil comprising a composite blade having a predetermined release trajectory.

In another aspect, an embodiment of the invention relates to an airfoil comprising a composite blade having a predetermined release trajectory including at least one energy dissipating member.

In another aspect, an embodiment of the invention relates to an airfoil comprising a composite blade having a predetermined release trajectory including at least one energy dissipating member wherein the at least one energy dissipating member is at least partially co-cured with the composite blade having a predetermined release trajectory.

In another aspect, an embodiment of the invention relates to an airfoil comprising a composite blade having a predetermined release trajectory including at least one energy dissipating member wherein the at least one energy dissipating member comprises at least one strand.

In another aspect, an embodiment of the invention relates to an airfoil comprising a composite blade having a predetermined release trajectory including at least one energy dissipating member wherein the at least one energy dissipating member comprises at least one damage initiator.

In another aspect, an embodiment of the invention relates to an airfoil comprising a composite blade having a predetermined release trajectory including at least one energy dissipating member wherein the at least one energy dissipating member is at least partially covered with a release agent.

In yet another aspect, an embodiment of the invention relates to an airfoil comprising a composite blade having a having at least one energy dissipating member.

In another aspect, an embodiment of the invention relates to an airfoil comprising a composite blade having a having at least one energy dissipating member, wherein the at least one energy dissipating member is at least partially co-cured with the composite blade.

In another aspect, an embodiment of the invention relates to an airfoil comprising a composite blade having a having at least one energy dissipating member, wherein the at least one energy dissipating member comprises at least one strand.

In another aspect, an embodiment of the invention relates to an airfoil comprising a composite blade having a having at least one energy dissipating member, wherein the at least one energy dissipating member comprises at least one damage initiator.

In another aspect, an embodiment of the invention relates to an airfoil comprising a composite blade having a having at least one energy dissipating member, wherein the at least one energy dissipating member is at least partially covered with a release agent.

In yet another aspect, an embodiment of the invention relates to an airfoil comprising a composite blade having a root, a tip, and a span therebetween; a leading edge, a trailing edge, and a chord therebetween; at least one energy dissipating member extending along the span and distributed along the chord, the at least one energy dissipating member having at least one strand, wherein the at least one energy dissipating member is at least partially covered with a release agent, wherein the at least one energy dissipating member is at least partially co-cured with the composite blade.

In another aspect, an embodiment of the invention relates to an airfoil comprising a composite blade having a root, a tip, and a span therebetween; a leading edge, a trailing edge, and a chord therebetween; at least one energy dissipating member extending along the span and distributed along the chord, the at least one energy dissipating member having at least one strand, wherein the at least one energy dissipating member is at least partially covered with a release agent, wherein the at least one energy dissipating member is at least partially co-cured with the composite blade, wherein the at least one energy dissipating member comprises at least one damage initiator, wherein the at least one strand is coupled to the at least one damage initiator.

In another aspect, an embodiment of the invention relates to an airfoil comprising a composite blade having a root, a tip, and a span therebetween; a leading edge, a trailing edge, and a chord therebetween; at least one energy dissipating member extending along the span and distributed along the chord, the at least one energy dissipating member having at least one strand, wherein the at least one energy dissipating member is at least partially covered with a release agent, wherein the at least one energy dissipating member is at least partially co-cured with the composite blade, wherein the at least one energy dissipating member comprises at least one damage initiator, wherein the at least one strand is coupled to the at least one damage initiator, wherein the at least one damage initiator comprises at least one pouch.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. All of the above outlined features are to be understood as exemplary only and many more features and objectives of the structures and methods may be gleaned from the disclosure herein. A more extensive presentation of features, details, utilities, and advantages of the present invention is provided in the following written description of various embodiments of the invention, illustrated in the accompanying drawings, and defined in the appended claims. Therefore, no limiting interpretation of the summary is to be understood without further reading of the entire specification, claims and drawings included herewith.

BRIEF DESCRIPTION OF THE DRAWINGS

The above-mentioned and other features and advantages of these embodiments, and the manner of attaining them, will become more apparent and the embodiments will be better understood by reference to the following description taken in conjunction with the accompanying drawings, wherein:

FIG. 10 is an alternate exemplary embodiment of the invention and is a side view of a composite blade with energy dissipating members having damage initiators;

FIG. 11 is a perspective view of the damage initiators from the exemplary embodiment of the invention in FIG. 10.

FIG. 12 and FIG. 13 are sectional cut-away views from the exemplary embodiments of the invention in FIG. 10 and the damage initiators of FIG. 11, in a "pre-event" and "post-event" condition respectively.

FIG. 14 is another exemplary alternate embodiment of the invention and a sectional side view of a composite blade with energy dissipating members and release zones;

FIG. 15 is another exemplary alternate embodiment of the invention and a side view of composite blade with an energy dissipating member;

DETAILED DESCRIPTION

Figure 1:
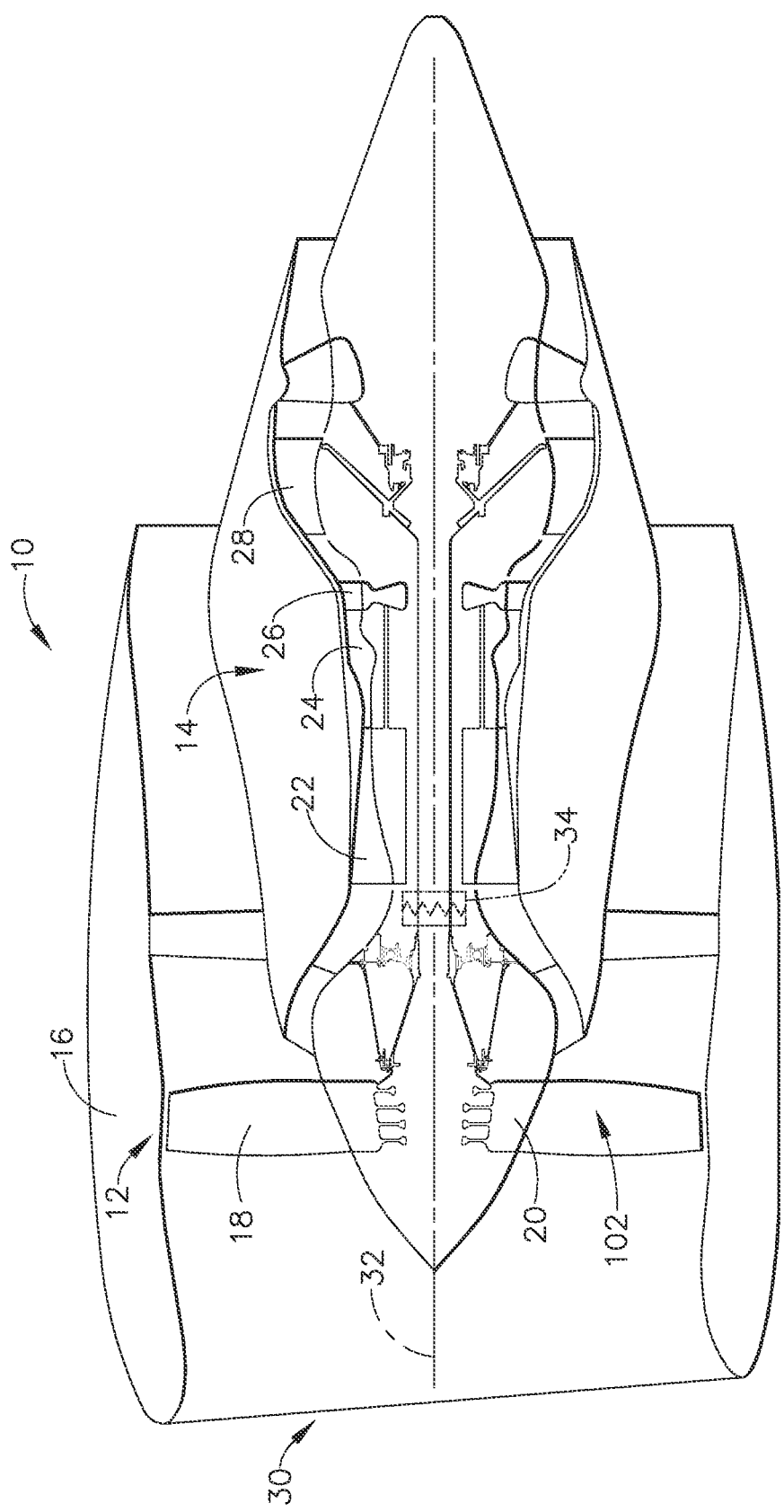
FIG. 1 is a side section view of a ducted fan gas turbine engine.

It is to be understood that the depicted embodiments are not limited in application to the details of construction and the arrangement of components set forth in the following description or illustrated in the drawings. The depicted embodiments are capable of other embodiments and of being practiced or of being carried out in various ways. Each example is provided by way of explanation, not limitation of the disclosed embodiments. In fact, it will be apparent to those skilled in the art that various modifications and variations may be made in the present embodiments without departing from the scope or spirit of the disclosure. For instance, features illustrated or described as part of one embodiment may be used with another embodiment to still yield further embodiments. Thus, it is intended that the present disclosure covers such modifications and variations as come within the scope of the appended claims and their equivalents.

Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

As used herein, the terms "axial" or "axially" refer to a dimension along a longitudinal axis of an engine. The term "forward" used in conjunction with "axial" or "axially" refers to moving in a direction toward the engine inlet, or a component being relatively closer to the engine inlet as compared to another component. The term "aft" used in conjunction with "axial" or "axially" refers to moving in a direction toward the engine nozzle, or a component being relatively closer to the engine nozzle as compared to another component.

As used herein, the terms "radial" or "radially" refer to a dimension extending between a center longitudinal axis of the engine and an outer engine circumference. The use of the terms "proximal" or "proximally," either by themselves or in conjunction with the terms "radial" or "radially," refers to moving in a direction toward the center longitudinal axis, or a component being relatively closer to the center longitudinal axis as compared to another component. The use of the terms "distal" or "distally," either by themselves or in conjunction with the terms "radial" or "radially," refers to moving in a direction toward the outer engine circumference, or a component being relatively closer to the outer engine circumference as compared to another component.

As used herein, the terms "lateral" or "laterally" refer to a dimension that is perpendicular to both the axial and radial dimensions.

All directional references (e.g., radial, axial, proximal, distal, upper, lower, upward, downward, left, right, lateral, front, back, top, bottom, above, below, vertical, horizontal, clockwise, counterclockwise) are only used for identification purposes to aid the reader's understanding of the present invention, and do not create limitations, particularly as to the position, orientation, or use of the invention. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary.

Fan blades for ducted fan gas turbine engines and propellers for single rotation turboprop and unducted counter-rotating propeller gas turbine engines have certain integrity to foreign object damage from birds, debris, and other items ingested by the engine. However, the ingestion of foreign objects may lead to release of portions of the rotating blade or propeller that may cause damage to other engine components or aircraft structures. In the case of fan blades for single rotation turboprop and unducted counter-rotating propeller engines, or open-rotors, if not otherwise managed, the lack of duct structure surrounding the blade or propeller for these types of engines presents the opportunity for the trajectory of the released portion of the blade or propeller to cause the portion to impact an adjacent trailing blade as well as other adjacent aircraft structure. The blades and propellers of the prior art lack frangibility to reduce the size and energy of any released blade portions. Thus ducted, unducted single rotation turboprop, and unducted counter-rotating fan blades and propellers that are resistant to foreign object damage yet frangible when desired may be provided.

A composite blade according to the present invention is described below in detail. As used in the brief descriptions of the illustrations, this paragraph, and hereafter, the term "blade" is understood to include, but is not limited to, both a fan blade and a propeller and the term "composite" is understood to include, but is not limited to, a reinforced polymer matrix composite, including matrices that are thermoset or thermoplastic and reinforcements that include, but are not limited to, glass, graphite, aramid, or organic fiber of any length, size, or orientation and furthermore understood to include, but is not limited to, being manufactured by injection molding, resin transfer molding, prepreg tape layup (hand or automated), pultrusion, or any other suitable method for manufacture of a reinforced polymer matrix composite structure. Additionally "composite" is understood to include, but is not limited to, a hybrid composite of reinforced polymer matrix composite in combination with metal or combinations of more than one reinforced polymer matrix composite or combinations of more than one metal. The term "co-cured" may be understood to include, but is not limited to, both the act of curing a composite and simultaneously bonding it to some other uncured material as well as the act of curing together of two or more elements, of which at least one may be fully cured and at least one may be uncured.

The term "trajectory" is understood to include, but is not limited to, the path taken by a released portion of a composite blade after the portion is released. This path may describe, for example, relative to the longitudinal centerline of a rotary machine, for example, a gas turbine engine centerline.

The composite blade may operate at high rotational speed and linear tip speeds and may comprise at least one of the means selected from the group consisting of, means for dissipating energy, means for self-shredding, and means for predetermining release trajectory. The composite blade may include one or more internal, co-cured, energy dissipating members that, after impact from a foreign object and release of a portion of a blade or full blade, may enable one of the functions selected from the group consisting of, dissipating kinetic energy of portions of the blade that may be released, shredding the blade or released portions of the blade, and acting to alter the trajectory of the released portion of the blade. The energy dissipating members may be located inside the composite blade or a portion of the energy dissipating members may be extended outside the composite blade and may run radially from the base or root of the blade to the blade tip, and may be distributed along the axial chord length of the blade. Additionally, some embodiments may include at least one bend in the energy dissipating members. The energy dissipating members may include strands or optional damage initiators to assist in shredding the blade in desired regions and to dissipate kinetic energy.

The term "self-shredding" is understood to include, but is not limited to, the ability of the composite blade to cause intended damage to the composite blade itself after the blade is impacted with sufficient force to release a portion of the composite blade, including the ability of energy dissipating members to break, rip, cut, or bulge surrounding composite blade structure, including for example, a reinforced polymer matrix structure, including matrices that are thermoset or thermoplastic and reinforcements that include, but are not limited to, glass, graphite, aramid, or organic fiber of any length, size, or orientation. Shredding may occur in series or simultaneously at the same or different thickness depths, chords, or spans of the composite blade and may result in the release of strips or shards of composite blade structure.

One exemplary non-limiting embodiment of the composite blade utilizes energy dissipating members with a strand and damage initiators, the strand and damage initiators being pulled through the structure of the composite blade after the composite blade is impacted with sufficient force to release a portion, thereby breaking the composite blade structure. Still other embodiments of the composite blades include release zones along the radial span of the blade that work in combination with the energy dissipating members to balance impact resistance and frangibility. Other embodiments include energy dissipating members including strands with slack or extra length staggered along the blade chord in a manner to align or alter the trajectory of a released portion to prevent impact with a trailing blade or other structure.

Referring initially to FIG. 1, a schematic side section view of a ducted fan gas turbine engine 10 is shown including a fan module 12 and an engine core 14, located along an engine axis 32. The fan module 12 includes a fan casing 16 surrounding an array of fan airfoils 18 extending radially distal from and coupled to a rotor 20. The engine core 14 includes a high-pressure compressor 22, a combustor 24, and a high pressure turbine 26. A low pressure turbine 28 drives the fan airfoils 18. Optionally, a speed reduction device 34 may be coupled between the low pressure turbine 28 and the rotor 20 to reduce the rotational speed of the fan module below that of the low pressure turbine 28. The optional speed reduction device 34 could be an epicyclical gearbox of a star or planetary configuration, a compound gearbox, or other arrangement of gearing to achieve a reduction of speed between the low pressure turbine 28 and the rotor 20.

In operation, air enters through the air inlet 30 of the engine 10 and moves through at least one stage of compression where the air pressure may be increased and directed to the combustor 24. The compressed air is mixed with fuel and burned providing the hot combustion gas which exits the combustor 24 toward the high pressure turbine 26 and low pressure turbine 28. At the high pressure turbine 26 and low pressure turbine 28, energy is extracted from the hot combustion gas causing rotation of turbine airfoils which in turn cause rotation about engine axis 32 of the shafts to the high pressure compressor 22 and fan airfoils 18 respectively. With respect to the embodiments described herein, fan airfoils 18 represent the location of composite blade 40 within fan module 12 and ducted fan engine 10.

Figures 2, 3:
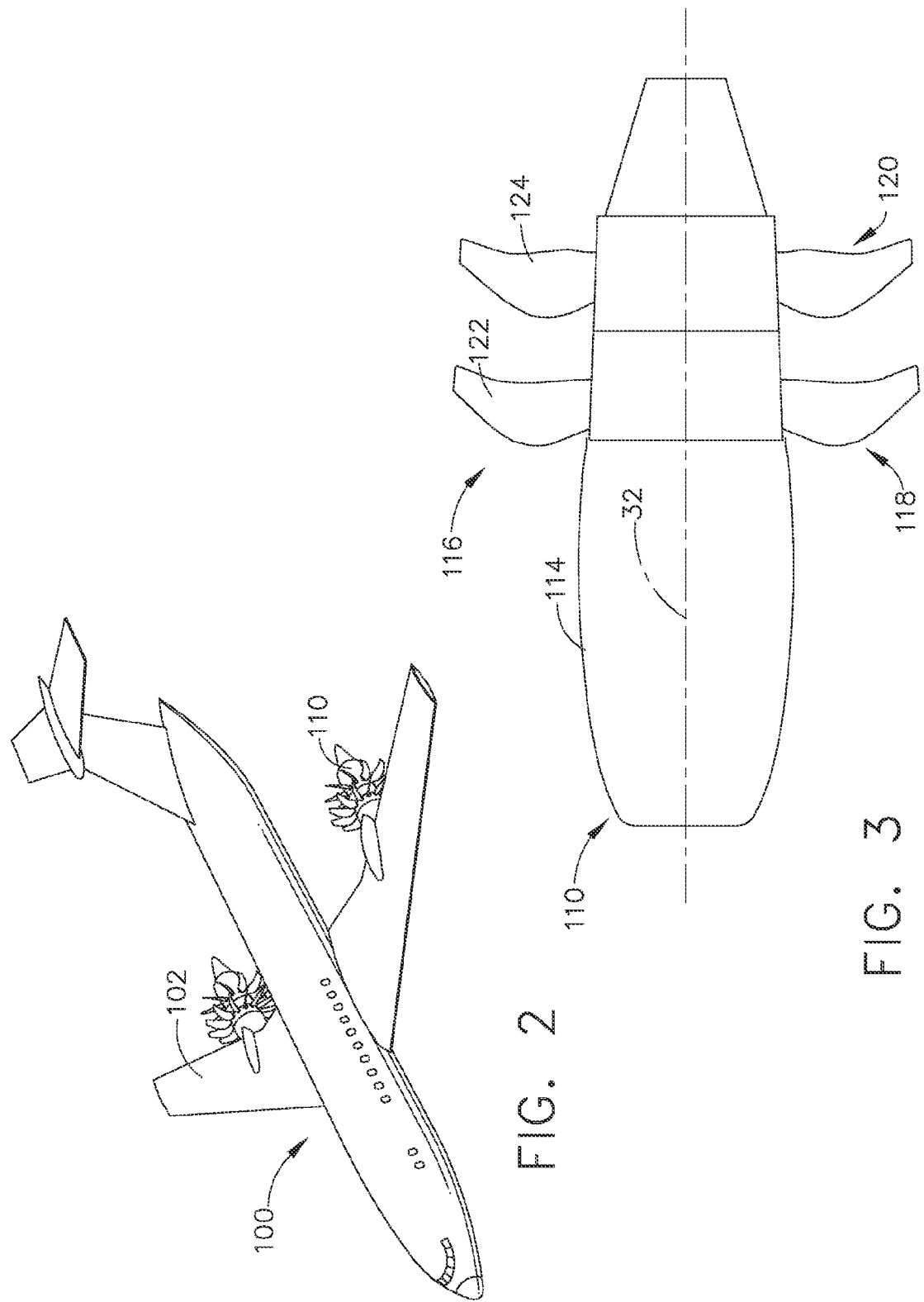
FIG. 2 is a perspective view of unducted counter-rotating propeller engines mounted on an aircraft.
FIG. 3 is a side view of a counter-rotating propeller engine.

Referring now to FIG. 2, shown is a perspective view of unducted counter-rotating propeller engines 110 mounted wings on 102 of an aircraft 100. Additionally, in FIG. 3, a side view of a counter-rotating propeller engine 110 is shown including an engine axis 32, cowling 114, and a fan module 116 having two stages of counter-rotating propellers, first stage 118 and second stage 120. Each of stages 118 and 120 has a plurality of propellers 122 and 124. Operation of engine 110 is the same as that discussed for the ducted fan engine 10 in FIG. 1, with fan module 116 having unducted propellers 122 and 124 that are not surrounded by a casing structure. A turboprop engine, although not shown in FIG. 2 or FIG. 3, has only a single stage propeller 118, again with no surrounding casing. With respect to the embodiments described herein, propellers 118 and 120 represent the location of composite blade within fan module 116 of counter-rotating propeller engine 110 and a turboprop engine with a single stage propeller 118. For clarity, in all three engine configurations described above the composite blade would rotate around respective engine axis 32.

Considering now FIG. 1, foreign objects, such as, but not limited to, birds, that are channeled through inlet 30 and are ingested into fan module 12, can cause damage to fan airfoils 18, fan casing 16, and other downstream structures in engine 10. Similarly, for counter-rotating propeller engine 110, as shown in FIG. 3, foreign objects can be in the path of fan module 116 during engine operation, causing damage to unducted propellers 122 and 124. Damage to fan airfoils or propellers can be particular troublesome, as these components can be relatively large in diameter and length when compared to engine core 14 diameter and the size of the potential foreign object that may impact the fan airfoils or propellers, for example, a bird or airfield debris. This large size allows for portions of the fan airfoils or propellers to release and cause secondary impacts and resulting follow-on damage. This damage can cause reduction in engine performance and in some instances loss of engine power.

Figure 4:
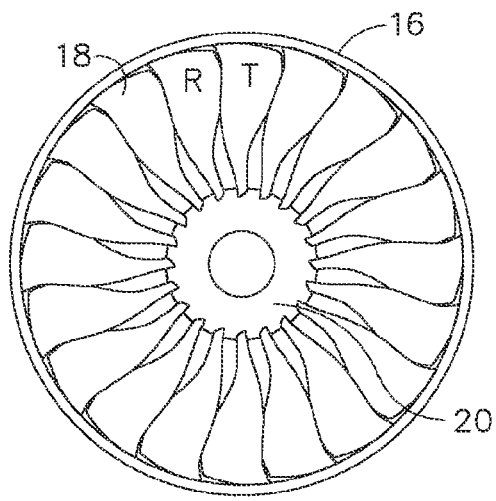
FIGS. 4, 5, 6, and 7 are respective time sequence front views of a ducted fan engine during release of an fan airfoil portion.
Figure 5:
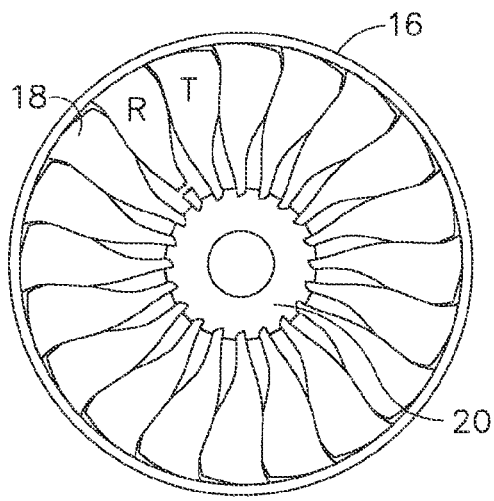
Figure 6:
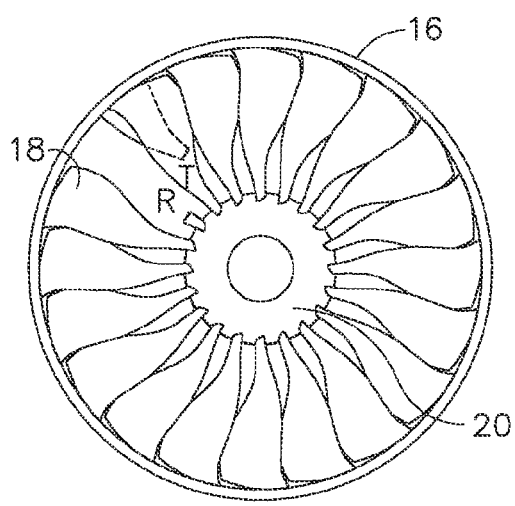
Figure 7:
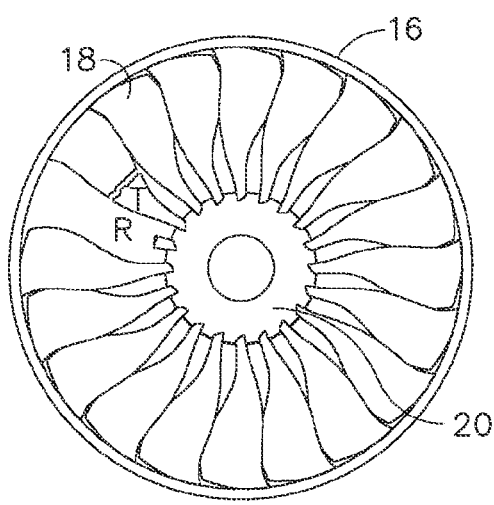

FIGS. 4, 5, 6, and 7 describe time phased images of events inside fan module 12 that may unfold after a fan airfoil 18 is impacted with a foreign object that causes release of a fan airfoil 18. This front view of ducted fan engine 10 uses a conventional stage of fan airfoils 18 and a fan casing 16. Referring now to FIGS. 4, 5, 6, and 7, each show twenty fan airfoils 18, twenty being an exemplary number of airfoils 18 only and do not intend to limit the invention in any manner, and fan case 16, and represent a time sequence of engine 10 during release of a portion of airfoil 18. One of the airfoils 18 in each of FIGS. 4-7 is identified with a letter R, designating it as a release airfoil or an airfoil 18 that may be initially impacted by a foreign object that in turn may result in a portion of airfoil 18 to release. Another airfoil 18, adjacent to released airfoil R, has been identified with a letter T, designating it as a trailing airfoil. A trailing airfoil T is an airfoil 18 that trails or lags airfoil 18 The identification of particular airfoils 18 as release blade and trailing blade are exemplary and do not limit the invention in any manner. In FIG. 4, all fan airfoils 18 are pristine, in that they have not been subject to impact from a foreign object. In FIG. 5, the release airfoil R has been impacted by a foreign object and may be now separated into two pieces. Moving to FIG. 6, the free portion of the release airfoil R may be about to impact the trailing airfoil T. Finally, in FIG. 7, the trailing airfoil T is separated into two pieces, caused by the impact of the free portion of the release airfoil R, with the free portion of the release airfoil R removed for clarity.

Due to the high rotational speed of the fan airfoils 18 in engine 10, any decrease in the size of the free portion of the release airfoil decreases the kinetic energy that the trailing airfoil T and fan case 16 would need to withstand. This decrease in required energy absorption leads to a relative weight reduction in fan case 16, as it allows the removal of containment provisions and structure in the case 16. The weight reduction then allows for the aircraft to carry more fuel for longer range or increased robustness by allowing the addition of weight in another area of the engine 10. Another important benefit resulting from reducing the size of the free portion is a parallel reduction of unbalance loads that rotor 20 experiences due to the eccentricity caused by the release of inertial load and variation of fan blade 18 loading on rotor 20 after release. These benefits can also be appreciated when considering the open rotor engine 110 and any decrease in size of the released portions of propellers 122 and 124.

Figure 9:
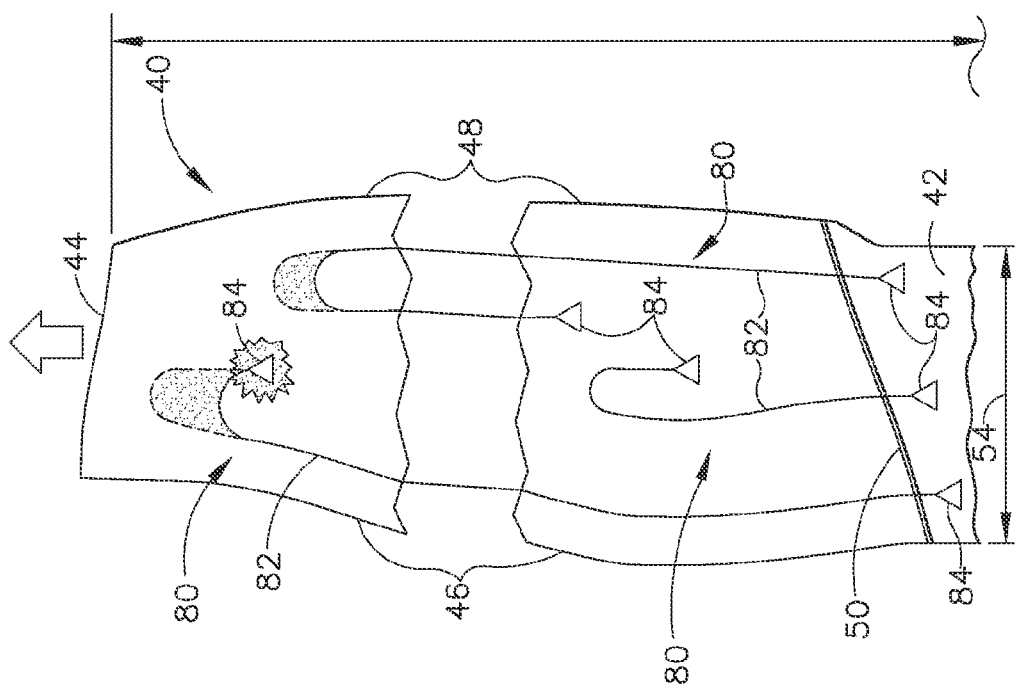
FIGS. 8 and 9 are exemplary embodiments of the invention and are side views of a composite blade with energy dissipating members, the blade shown in a pristine state and separated state respectively.
Figure 8:
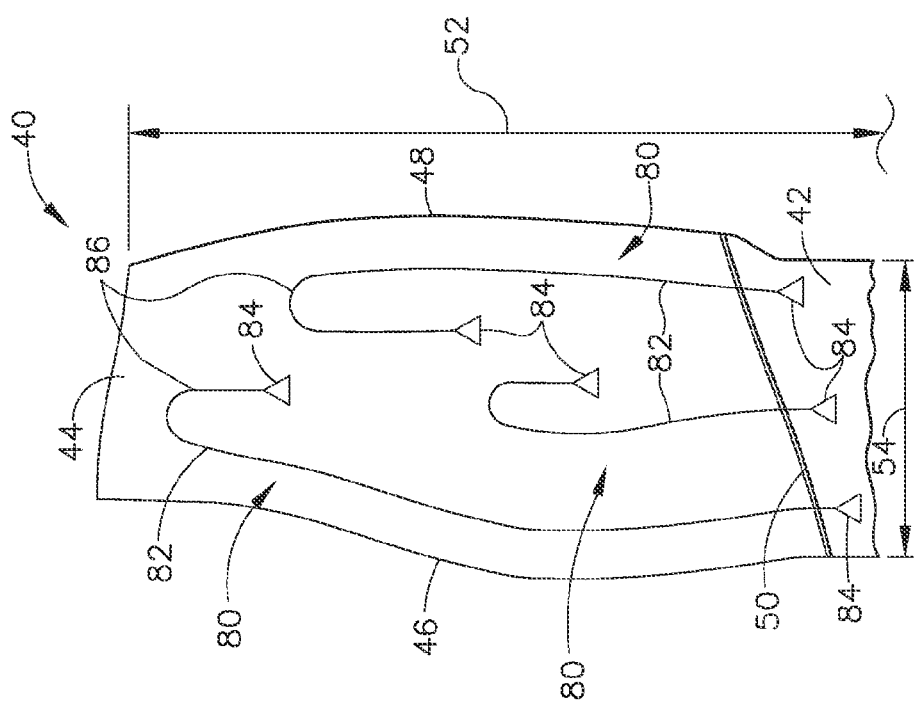

As shown by the exemplary embodiments of the invention in FIGS. 8 and 9, this goal may be accomplished by incorporating one or more energy dissipating members 80 into composite blade 40. First considering FIG. 8, showing composite blade 40 in a pristine state, having a root 42, a tip 44, a leading edge 46, and a trailing edge 48, with the span 52 of the blade 40 radially distally from root 42 to tip 44 and axial chord 54 moving aft from leading edge 46 to trailing edge 48. An inner flowpath 50 may be defined in the span radially distal to root 42 along the chord 54 and represents the lowest radial portion of the span 52 that would be subject to a foreign object impact event. In this exemplary embodiment, composite blade 40 has three energy dissipating members 80, having lengths of strands 82, each optionally beginning in root 42 and extending radially distally toward the tip 44, and then bending back radially and proximally toward the inner flowpath 50, forming at least one optional bend 86. Although the energy dissipating members 80 in the embodiment begin at root 43, the members 80 may begin anywhere in composite blade 40, for example, the tip, mid-span, or the like. Coupled to both ends of each strand 82 may be at least one damage initiator 84 defined in a configuration as described above. In this embodiment, the placement of individual energy dissipating members 80 were selected to include one end radially below the inner flowpath 50, with the member running through and radially above the inner flowpath 50, however this placement and arrangement of members 80 is not limiting. Three energy dissipating members 80 were shown in this exemplary embodiment, but any number of members 80 could be used.

Non-limiting embodiments of the energy dissipating members may include strands that may be inside, may partially extend outside, and may be co-cured with the composite blade. Strand materials may include, but are not limited to, Zylon® a registered trademark of Toyobo Corporation (Poly (p-phenylene-2, 6-benzobisoxazole)) fiber, high strength metal wires, or any other suitable high strength material in the form of strands. Exemplary, non-limiting embodiments of the section shape of strands may be circular, oval, polygonal, or irregular and can range in sectional dimension from about 0.005 inches to about 0.075 inches and from about 0.010 inches to about 0.030 inches. Other exemplary, non-limiting embodiments of the sectional area of strands can range in sectional area from about 0.0001 square inches to about 0.02 square inches and from about 0.001 square inches to about 0.002 square inches. Other exemplary non-limiting strand forms may include braid, weave, strip or tape forms. Strand sections may be constant along the length or vary in section size, section shape, form, and material, including, but not limited to, increasing in size from one end of the length to the other.

Exemplary shape and material aspects of the damage initiators may be tailored to the contours of the composite blade in a local regions and also material selections may be tailored as not to react chemically with the composite blade during co-cure, assembly, or composite blade operation. Non-limiting embodiments of damage initiators may include contoured, solid, hollow, or serrated, wedges of metallic, ceramic, or composite construction, which are not illustrated for ease of understanding purposes, and may also be inside and may be co-cured with the composite blade. Such Damage initiator materials may include, but are not limited to, steel, aluminum, titanium, cobalt, chromium, and nickel metal alloys, or any other suitable metal alloy. Other damage initiator materials may include, but are not limited to, ceramic oxides, including beryllia, ceria, and zirconia, non-oxides, including carbide, boride, nitride, and silicide, as well as oxides and nonoxides alone or in combination, with or without particulate reinforcement or fiber reinforcement. Another non-limiting embodiment of a damage initiator includes at least a partially hollow pouch at least partially filled with filler. Forms of fillers may include, but are not limited to, fluids or semi-solids. Fluids and semi-solid materials may include, but are not limited to, silicones, gels, caulks, or other incompressible or nearly incompressible materials, or a combination of these, suitable for composite manufacturing. The pouch may contain a plunger that works in combination with a strand and may expand the pouch by plunging to shift the contents of the pouch when the strand is strained, thereby initiating the shredding in the region of the composite blade around the pouch. Optionally, fillers may be also small solid metallic or ceramic pieces alone or in combination with the fluid and semi-solid fillers described above. After the composite blade is impacted with sufficient force to release a portion of the blade, another exemplary non-limiting mode of shredding utilizes energy dissipating members with a strand and a pouch, the strand being pulled through the structure of the composite blade, activating and expanding the pouch, thereby shredding the composite blade structure.

The energy dissipating members, including the non-limiting example of the strands and damage initiators, may be at least partially covered with release agent, film, or coating to assist the members in dissipating energy by facilitating the initial sliding or movement of the member within the composite blade. Release agents may include, but are not limited to, Frekote® a registered trademark of Henkel Corporation, EUROCOAT, Teflon® a registered trademark of DuPont Company (polytetrafluoroethylene), or other suitable release agents for manufacturing composites.

Any combination of composite blade elements including, but not limited to energy dissipating members, strands, and damage initiators, including all variations in location, material, manufacture, shape, size, sectional properties, and length properties of any element may be suitable for employing for energy dissipation, shredding, and trajectory alignment. The present invention also relates to methods for the fabrication of a composite blade. Additionally, the present invention relates to assembly of a frangible or composite blade into and for use in a rotary machine. This method may utilize any combination of composite blade elements as described above.

Now moving to FIG. 9, an exemplary embodiment of FIG. 8 is shown in a separated state, similar to that described above in FIGS. 4-7 when referring to the release blade R and trailing blade T after being impact by the foreign object or a free portion of the release blade respectively. As shown, the strands 82 may be strained or stretched when the composite blade may be impacted. This imparted strain into the strands draws kinetic energy from the releasing portion of the composite blade 40 reducing the impact energy an adjacent composite blade 40 or fan case 16 would experience and be required to withstand. Along with the strain imparted to the strands 82, the releasing portion of the composite blade 40 drags the co-cured strands 82 through the internal structure of the composite blade 40, again reducing the kinetic energy of the released portion and concurrently shredding both the retained and the released portion of the blade 40. The optional damage initiators 84 assist in the shredding of the released portion, and may break down the larger portion into two or more portions having lower individual kinetic energies.

FIG. 10 is another exemplary embodiment of composite blade 40, again having a root 42, a tip 44, a leading edge 46, and a trailing edge 48, with the span 52 of the blade 40 radially distally from root 42 to tip 44 and axial chord 54 moving aft from leading edge 46 to trailing edge 48. Again, an inner flowpath 50 may be defined in the span radially above the root 42 along the chord 54 and represents the lowest radial portion of the span 52 that would be subject to a foreign object impact event. In this exemplary embodiment, composite blade 40 has five energy dissipating members 80. Each energy dissipating member 80 has at least one strand 82, at least a portion of which is external to the composite blade 40. The radially proximal end of the strand 82 is coupled to rotor 20, then the length of strand 82 progresses radially distal to pass through root 42, through inner flowpath 50 into span 52, where the strand 82, at its radially distal end, may be coupled to damage initiator 84, in this exemplary embodiment of damage initiator 84. Five energy dissipating members 80 were shown in this exemplary embodiment, but any number of members 80 could be used.

An exemplary damage initiator 84 as described in the composite blade 40 of FIG. 10 is shown in FIG. 11. This exemplary damage initiator 84 has a pouch 90, a plunger 92, and may be at least partially filled with filler 94. The shape and size of pouch 90 may be adapted to be of any appropriate size, shape, and configuration to conform to the local contours and size of the composite blade 40 in the region it is placed and the illustrated configurations is for illustration purposes only. Strand 82 may pass through pouch 90 and may be coupled to plunger 92. At least a portion of energy dissipating members 80 may be coated by release agent 96. In this exemplary embodiment at least a portion of the exterior of pouch 90 and strand 82 may be covered with release agent 96 to promote the initiation of separation and shredding. The perimeter of plunger 92 may be adapted to conform to pouch 90 in a "pre-event" position, where the blade 40 has not yet been impacted with foreign object damage to the extent that the energy dissipating members 80 have been activated.

FIG. 12, a section view of FIG. 10, depicts pouch 90, plunger 92, and strand 82 in the pre-event position. In the event that composite blade 40 may be impacted by a foreign object, the energy imparted on the composite blade 40 may cause the release of a portion of the blade 40. If this event occurs, the strand 82 and plunger 92 may be activated. This activation may occur when the released portion of the blade 40 separates at a location radially proximal to the damage initiator 84 yet radially distal from the radial proximal end of the related strand 82 that may be coupled to rotor 20. Once impacted with force that may cause separation of the blade 40, the released portion of the blade 40 may move radially distal from rotor 20. However the end of related strand 82 that may be coupled to a rotor 20 may not move with the released blade portion, this may cause relative motion between the end of strand 82 coupled to rotor 20 and the released portion of blade 40 that may include the radially distal end of strand 82 that may be coupled to damage initiator 84. This relative motion may cause the strand 82 coupled to damage initiator 84 to be pulled substantially proximally radially into an "after-event" position, shown in the section view FIG. 13 of FIG. 10.

As plunger 92 is pulled into the after-event position, plunger 92 may compress any filler 94 in pouch 90. Since the perimeter of plunger 92 may conform to pouch 90, and the pouch may be filled with an incompressible filler 94, the force imparted by plunger 92 on filler 94 is transferred into pouch 90, thereby expanding pouch 90. As the pouch 90 may be contained within composite blade 40, this expansion bulges the composite blade 40 as well. Also, with the optional assistance of release agent 96, a separation zone may form in the composite blade adjacent to damage initiator 84. The expanded and separated regions of composite blade 40 may thereby shred and weaken blade 40. The shredding may take the form of delamination in the composite structure, broken fibers, broken matrix, and the like. This reduces the amount of load bearing composite structure and thereby the strength of the composite at and around the shredded location. Since, during operation, the composite blade is under high centrifugal loads, this reduction in strength may lead to further damage to the composite blade 40 by distribution of the loads over a smaller section of the blade 40. This may ultimately lead to separation and release of an additional portion of the blade 40.

This weakening, or shredding, of composite blade 40 is repeated for each energy dissipating member 80 in composite blade 40 that may be activated. By staggering the axial and radial location of energy dissipating members 80 in composite blade 40, sequencing and combinations of shredding may result. This may be accomplished by placing energy absorbing members at varied thicknesses in the composite blade sections and by varying the size and shape of the damage initiators 84 to accommodate local geometry differences at these thicknesses and locations. Also, within an energy dissipating member 80, one or more damage initiators 84 may be used and may be distributed along strand 82 in a series. Additionally, within an energy dissipating member 80, strand 82 may have slack or extra length between damage initiators 84 distributed in series, the slack may shred the composite blade 40 when the strand 82 is dragged through composite blade 40 and may delay activation of a damage initiator 84 that may be place in series. Five energy dissipating members 80 were shown in this exemplary embodiment, but any number of members 80 could be used.

Referring now to FIG. 14, a sectional side view of another exemplary embodiment of a composite blade 40 is shown, again having a root 42, a tip 44, a leading edge 46, and a trailing edge 48, with the span 52 of the blade 40 radially distally from root 42 to tip 44 and axial chord 54 moving aft from leading edge 46 to trailing edge 48. Again, an inner flowpath 50 may be defined in the span radially above the root 42 along the chord 54 and represents the lowest radial portion of the span 52 that would be subject to a foreign object impact event.

In the exemplary embodiment of FIG. 14, the span 52 of composite blade 40 may be radially apportioned into three release zones, a low span zone 60, a mid span zone 62, and a high span zone 64. Within each release zone there may be one or more cavities, identified for exemplary purposes only in the size, shape, configuration, and positioning as illustrated, as 60A, 60B, 60C for low span zone 60, as 62A and 62B for mid zone 62, and as 64A and 64B for high span zone 64. These cavities may be devoid of filler or optionally filled with resin, foam, loose media, or the like. The radially proximal ribs of cavities 60C, 62B, and 64B include one or more flanges 66 paired with passages 68 connecting adjacent cavities. Similarly, cavities 62A and 64A include passages 68 connecting adjacent cavities. Three energy dissipating members 80 may be inside and co-cured with the composite blade 40 and run radially from the root 42 to the tip 44, through passages 68 and flanges 66 and may be distributed axially along chord 54 as not to overlap. Optional damage initiators may be coupled to the strands at and nest inside flanges 66.

The release zone cavities work in combination with the energy dissipating members and damage initiators seeking to balance the impact resistance and frangibility of the blade along the radial span of the blade. When a foreign object impacts the composite blade 40 at the high span zone 64 in the area of cavity 64A with enough energy to separate the entire high span zone 64 portion of the composite blade 40, the energy dissipating member 80 passing through flange 66 and passage 68 of cavity 64B will be strained, as described in FIG. 9, reducing the kinetic energy of the released portion. The damage initiator nested inside flange 66 will also be pulled through flange 66 and the passage 68 and shred the released portion, into more than one fragment or portion, each with a lower individual kinetic energy. However, for the present example, the other two energy dissipating members 80 may not be strained, as they may be radially proximal to the released (entire high span zone 64) portion of the composite blade 40, and therefore have not degraded the integrity of low span zone 60 and mid span zone 63 to impact. The radially apportionment of release zone cavities combined with multiple energy dissipating members provides frangibility in areas radially distal to the impact zone but keeps impact resistance in areas proximal to the impact zone. Three energy dissipating members 80 were shown in this exemplary embodiment, but any number of members 80 could be used. Similarly, three span zones and seven cavities were shown, but any number of zones, cavities, flanges and passages could be used.

Turning now to FIG. 15, a side view of another exemplary embodiment of a composite blade 40, again having a root 42, a tip 44, a leading edge 46, and a trailing edge 48, with the span 52 of the blade 40 radially distally from root 42 to tip 44 and axial chord 54 moving aft from leading edge 46 to trailing edge 48. Again, an inner flowpath 50 may be defined in the span radially above the root 42 along the chord 54 and represents the lowest radial portion of the span 52 that would be subject to a foreign object impact event. Composite blade 40 has a single energy dissipating member 80, running radially from the root 42 to the tip 44 in a staggered pattern from leading edge 46 to trailing edge 48 as not to overlap. Other exemplary stagger patterns for energy dissipating member 80 may start at the rotor 20 or blade root 42, running radially distal along span 52, in a serpentine path through chord 54 to the blade tip 44 and vary in depth through the blade 40 thickness. An additional exemplary stagger pattern for energy dissipating member 80 may be irregular in stagger along the span and chord of blade 40 and may form at least one optional bend 86 as energy dissipating member 80 may run radially distal from root 42 or rotor 20 to tip 44. This exemplary energy dissipating member 80 may be inside and co-cured with the composite blade 40. The embodiment of the energy dissipating member 80 may be a strand as described in the exemplary embodiment in FIG. 8 above. In this present embodiment, the staggered pattern may provide slack or extra length to member 80, as opposed to a shorter length that would run from the root 42 directly to the tip 44. Upon impact of foreign object damage to composite blade 40, the portion of the blade 40 that may be released will pull the member 80 radially and proximally from the released portion reducing the kinetic energy of the released portion. Additionally, as will be described below, the placement and stagger of the energy dissipating member 80 can alter the trajectory of the released portion of composite blade 40. A single energy dissipating member 80 was shown in this exemplary embodiment, but any number of members 80 could be used.

Referring briefly back to aircraft 100, in FIG. 2, which has a counter-rotating propeller gas turbine engine 110, also called an open-rotor, mounted on aircraft 100, if a portion of a propeller is released from fan module 116, there may be a possibility that the portion of propeller may impact the aircraft fuselage. As briefly mentioned above, the placement of and stagger of an energy dissipating member within composite blade 40 will modify the trajectory of the released portion of composite blade 40. This modification may be beneficial because it may be desirable to direct the released portion away from an adjacent composite blade 40 or aircraft structure, potentially including an aircraft fuselage.

Figure 16:
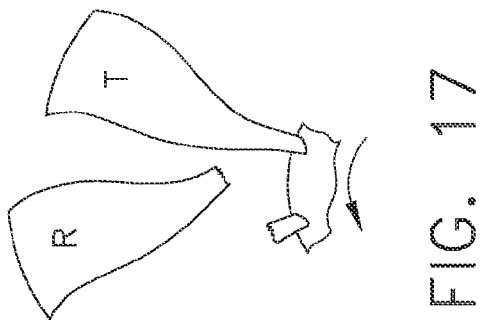
FIGS. 16, 17, 18, and 19 are respective time sequence front views of propellers during release of a propeller portion after an impact event; and, FIGS. 20, 21, 22, and 23 are respective time sequence front views of the exemplary alternate embodiment of the invention of FIG. 15 during release of a portion after an impact event.
Figure 17:
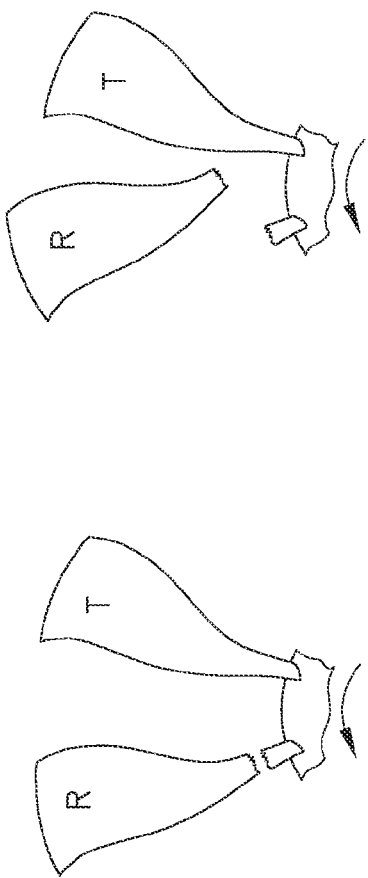
Figure 18:
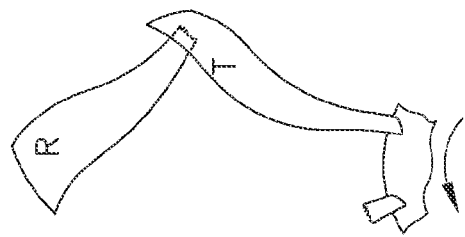
Figure 19:
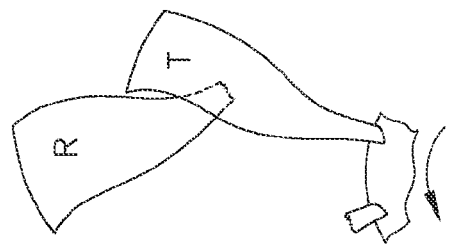

FIGS. 16 through 19 and FIGS. 20 through 23 describe this trajectory modification, using a baseline blade time sequence (FIGS. 16-19) and a time sequence describing and exemplary embodiment of the instant invention composite blade 40 (FIGS. 20-23). Like the time sequence detailed in FIGS. 4-7, one of the airfoils in each of FIGS. 16-19 is identified with a letter R, designating it as a release airfoil and another has been identified with a letter T, designating it as a trailing airfoil. The sequence starts with FIG. 16 depicting a release airfoil just after impact from a foreign object and a trailing airfoil in a pristine condition. Next, in FIG. 17, a portion of the release airfoil may be moving toward the trailing airfoil, with the radial proximal end of the portion rotating toward the trailing airfoil but not yet impacting the trailing airfoil. Then in FIG. 18, radially proximal end of the released portion, although any other portion of the release airfoil can impact the trailing airfoil, may impact the trailing airfoil, distorting the shape of the trailing airfoil. Finally, in FIG. 19, the released portion of release airfoil continues to impact and further distorts the trailing airfoil. Depending on the kinetic energy of the released portion of the release airfoil and the contact location on the trailing airfoil, this level of distortion may cause the trailing airfoil to break as well.

In contrast, as shown in FIGS. 20-23, where the exemplary embodiment of composite blade 40 from FIG. 15 is in the position both of the release blade, again designated as R, and the adjacent trailing blade, similarly designated as T, this time sequence is repeated. The sequence starts with FIG. 20, again depicting a release blade just after impact from a foreign object and a trailing blade in pristine condition. However, in FIG. 20, the released portion of the release blade is tethered to the held portion of the released blade by energy dissipating member 80. Next, in FIG. 21, the released portion of the release blade is moving toward the trailing blade as the radial proximal end of the portion is tethered to the held portion by energy dissipating member 80. In FIG. 21, the energy dissipating member 80, as described above, has a staggered pattern providing slack or extra length in composite blade 40. As the kinetic energy of released portion moves the portion radially distal from the held portion, the slack in the energy dissipating member 80 may be pulled through the released portion in a preferred direction relative to the trajectory of the released portion aligned while reducing the kinetic energy of the released portion. As the released portion continues to move radially distal, the slack in the energy dissipating member 80 may be reduced with the released portion staying aligned with the held portion, as shown in FIG. 22. Finally, as shown in FIG. 23, when the slack in the energy dissipating member 80 is consumed, the member 80 may break, with the released portion continuing on the aligned path, both reducing the kinetic energy of the released portion and avoiding the trailing blade. This same concept can be used to tether the released portion in a manner to preferentially align the released portion predominately aft, away from an aircraft 100 and nearby aircraft structures.

The aforementioned exemplary embodiments of composite blade 40 can be utilized in rotary machines, including, but not limited to, ducted fan, open-rotor, turbo prop gas turbine engines, and land based gas turbines, with ranges of blade 40 counts including, but not limited to, from about 2 to about 24, and from about 8 to about 16, additionally from about 10 to about 14. Span 52 of these exemplary embodiments of composite blade 40 can range from including, but not limited to, about 20 inches to about 90 inches, and from about 40 inches to about 70 inches, and from about 50 to about 70 inches. Chord 54 of these exemplary embodiments of composite blades 40 can range from including, but not limited to, about 5 inches to about 40 inches, and from about 10 inches to about 30 inches, and from about 12 to about 24 inches.

Figure 24:
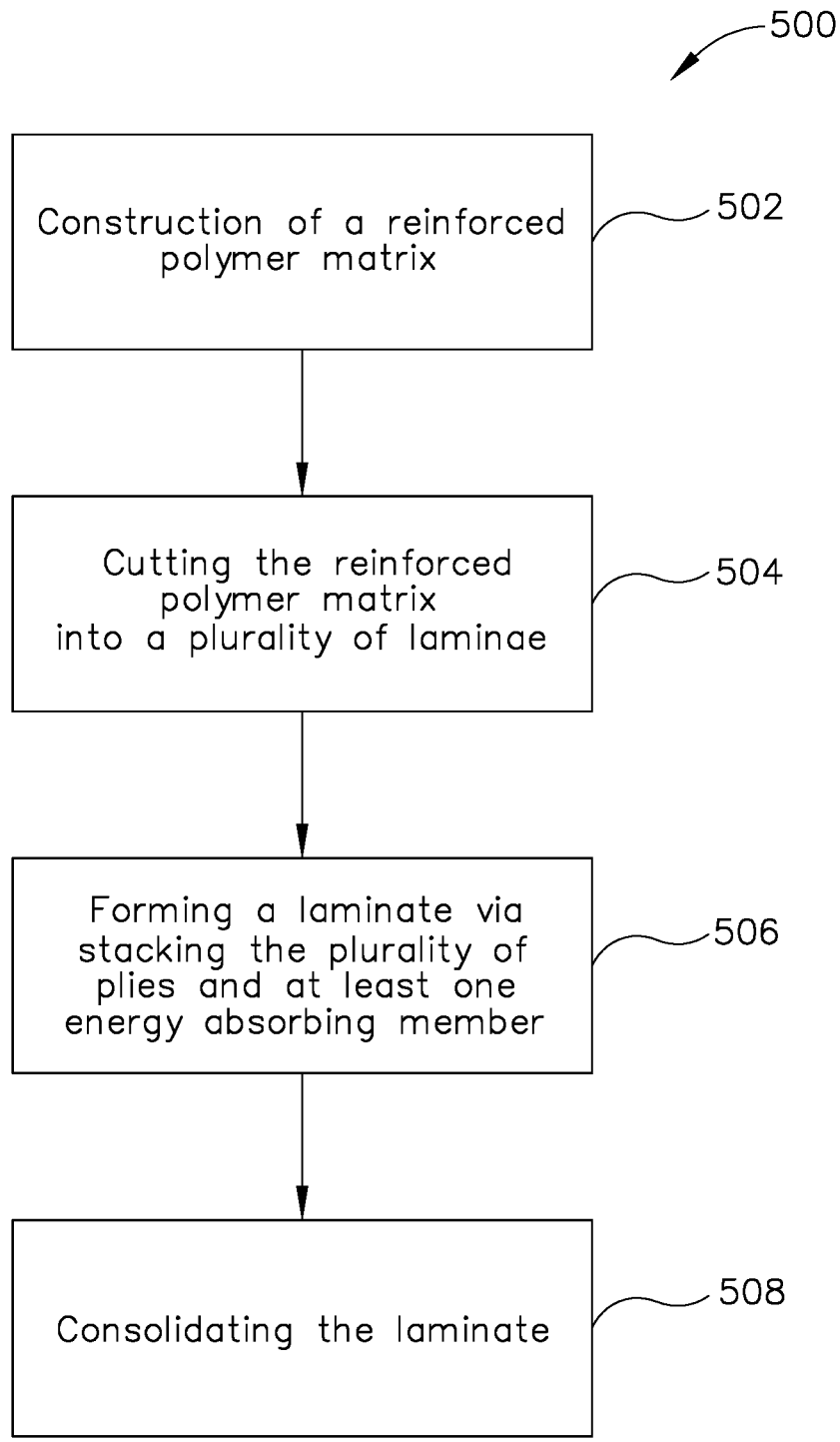
FIG. 24 is a flow diagram which summarizes sequential process steps carried out according to the method of the present invention.

FIG. 24 shows one exemplary non-limiting process 500 for the fabrication of a frangible laminate, one non-limiting example frangible laminate may be a composite blade 40. This process 500 may include a substantially unidirectional pre-impregnated (prepreg) process that constructs a reinforced polymer matrix from resin and reinforcement material 502. The reinforcement material may take the form of fibers, rovings, mats, woven rovings, woven yarns, braids, or stitched fabrics. The resin is provided as either liquid at room temperature or may be heated to a liquid state. Then the reinforcement material is impregnated with the resin to form a reinforced polymer matrix. Impregnation, also referred to as sizing, may occur by spraying, dipping, pasting, or similarly depositing resin on the reinforcement material in one or more layers or sizing steps. A non-limiting example is carbon fibers as a unidirectional reinforcement material that is impregnated with an epoxy resin. Other exemplary, non-limiting, resins include polyether ether ketone (PEEK), polyetherketoneketone (PEKK), polyphenylene sulfide (PPS), polyamideimide (PAI), and polyetherimides (PEI), as well as polyester, phenolic, vinyl ester, polyurethane, silicone, polyamide, polyamide-imide, and the like. Some of these resins may be toughened by incorporating discrete elastic, for example, elastomeric rubber, or thermoplastic material dispersed in the resin, or the like.

In the exemplary non-limiting process 500, a lay-up process may be performed next. The lay-up process includes cutting the reinforced polymer matrix into a plurality of laminae 504. As used in this description, the term laminae refer to complete plies, ply segments, and portions of plies in shapes and strips. The laminae and a least one energy dissipating member 80 are then stacked to produce a laminate 506. One or more energy dissipating members 80 may be placed at varied positions in the laminate, and may be inside the laminate or partially outside the laminate, as shown in the exemplary embodiment of the composite blade in FIG. 10. The process may also include ultrasonically-assisted stitching processes, in which reinforcement fibers may be inserted through multiple ply layers, improving the qualities of the laminate as a whole. The lay-up process may also include shaping the laminae prior to and during the stacking of laminae and energy dissipating members 80. A machine lay-up process may save labor cost when considered in contrast to conventional lay-up processes that use manual skill and labor to cut the plies and construct and shape the laminae.

Finally, the process may use a consolidating process to shape and cure the laminate to yield a composite blade 508. A consolidating process uses consolidating forces to press the laminate and its laminae into the desired shape and may be part of the lay-up process and may be performed in-situ. One non-limiting example is an autoclave process that places a laminate in a high-pressure device to shape and cure the laminate. Suitable autoclave temperatures include temperatures from about 400° F. to about 840° F., preferably from about 600° F. to about 760° F.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application.

What is claimed is:

1. An airfoil, comprising:
  a self-shredding composite blade comprising at least one energy dissipating member, wherein the at least one energy dissipating member comprises at least one pouch,
  said at least one pouch comprising an interior and an exterior;
  wherein both the interior and the exterior of said at least one pouch are internal to said airfoil,
  wherein the exterior of said at least one pouch is at least partially covered with a release agent to promote the initiation of separation of said self-shredding composite blade.

2. The airfoil of claim 1, wherein the at least one energy dissipating member is at least partially co-cured with the self-shredding composite blade.

3. The airfoil of claim 1, wherein the at least one energy dissipating member comprises at least one strand.

4. The airfoil of claim 3, wherein the at least one strand is at least partially covered with a release agent to promote the initiation of separation of said self-shredding composite blade.

5. The airfoil of claim 1, wherein the at least one energy dissipating member comprises at least one damage initiator.

6. The airfoil of claim 1, wherein the interior of said at least one pouch is at least partially filled with a filler material.

7. The airfoil of claim 6, wherein said filler material comprises an incompressible fluid.

8. An airfoil, comprising:
  a composite blade comprising:
    a radially inner root portion coupled to a rotor;
    an inner flowpath;
    a strand coupled to the rotor at a radially proximal end of the strand and passing through the root portion and inner flowpath;
    at least one energy dissipating member wherein the at least one energy dissipating member comprises at least one pouch, the pouch conforming to the composite blade, and
    a plunger, the perimeter of the plunger conforming to the pouch,
    wherein a distal end of the strand is coupled to the plunger.

9. The airfoil of claim 8, wherein the at least one energy dissipating member is at least partially co-cured with the composite blade.

10. The airfoil of claim 8, wherein the pouch is filled with incompressible filler material.

11. The airfoil of claim 10 wherein the strand pulls on the plunger, the perimeter of the plunger plunges into the pouch pushing on the incompressible filler material and initiating shredding in the region of the composite blade adjacent the pouch.

12. The airfoil of claim 8, wherein the at least one energy dissipating member is at least partially covered with a release agent.

13. An airfoil comprising:
- a composite blade having a root, a tip, and a span therebetween,
- a leading edge, a trailing edge, and a chord therebetween,
- at least one energy dissipating member extending along the span and distributed along the chord, the at least one energy dissipating member having at least one strand, wherein the at least one energy dissipating member is at least partially covered with a release agent, wherein the at least one energy dissipating member is at least partially co-cured with the composite blade, and wherein the least one damage initiator comprises at least one pouch;
- said at least one pouch comprising an interior and an exterior;
- wherein both the interior and the exterior of said at least one pouch are internal to said airfoil.

14. The airfoil of claim 13, wherein the at least one energy dissipating member comprises at least one damage initiator, wherein the at least one strand is coupled to the at least one damage initiator.

15. The airfoil of claim 14, wherein the interior of said at least one pouch is at least partially filled with a filler material.

16. The airfoil of claim 15, wherein said filler material comprises an incompressible fluid.

17. The airfoil of claim 16, wherein said at least one pouch conforms to the local contours of said composite blade.

18. The airfoil of claim 17, further comprising a plunger;
- wherein said at least one strand passes through said at least one pouch and couples to said plunger; and
- wherein the perimeter of said plunger conforms to said at least one pouch.

19. The airfoil of claim 18, wherein said plunger imparts a force on said filler material.

* * * * *